US007729689B2

(12) United States Patent
Chakraborty et al.

(10) Patent No.: US 7,729,689 B2
(45) Date of Patent: Jun. 1, 2010

(54) MOBILE WIRELESS DEVICE ADAPTATION BASED ON ABSTRACTED CONTECTUAL SITUATION OF USER USING NEAR-FIELD COMMUNICATIONS AND INFORMATION COLLECTORS

(75) Inventors: Dipanjan Chakraborty, Kolkata (IN); Sudha Krishnamurthy, Bangalore (IN); Sumit Mittal, Uttar Pradesh (IN); Sunil Chandra, Bangalore (IN); Pankaj Kankar, New Delhi (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/457,301

(22) Filed: Jul. 13, 2006

(65) Prior Publication Data

US 2008/0014966 A1  Jan. 17, 2008

(51) Int. Cl.
 *H04M 3/00* (2006.01)
(52) U.S. Cl. ............... 455/418; 455/456.1; 455/456.4; 340/572.1
(58) Field of Classification Search ............ 455/418, 455/456.1, 456.4; 340/572.1
See application file for complete search history.

(56) References Cited

U.S. PATENT DOCUMENTS

| 6,122,486 | A  | 9/2000  | Tanaka et al. |
| 6,714,778 | B2 | 3/2004  | Nykanen et al. |
| 6,831,970 | B1 | 12/2004 | Awada et al. |
| 6,832,093 | B1 | 12/2004 | Ranta |
| 6,907,254 | B1 | 6/2005  | Westfield |
| 2002/0039909 | A1 | 4/2002 | Rankin |
| 2004/0087318 | A1 | 5/2004 | Lipovski |
| 2004/0158638 | A1* | 8/2004 | Peters et al. ............ 709/227 |

(Continued)

OTHER PUBLICATIONS

J. Mitola, III et al., "Cognitive radio: Making software radios more personal," IEEE Personal Communications, vol. 6, issue 4, Aug. 1999.
F. Siegemund et al., "Interaction in pervasing computing settings . . . "PerComm 2003, http://www.vs.inf.ethz.ch/publ/papers/106-siegemund-floerkemeier.pdf.

(Continued)

*Primary Examiner*—Danh C Le
(74) *Attorney, Agent, or Firm*—Gibb I.P. Law Firm, LLC

(57) ABSTRACT

A mobile wireless device, such as a mobile wireless phone, is adapted based on a user's current abstracted contextual situation, where the context of a user is determined using devices enabled with near-field communication technology. Dynamic information of a user of a mobile device, such as the identity of his or her current environment, is determined using near-field communication, such as radio-frequency identification (RFID) tags. Static information regarding the user is also determined, where such static information can include the user's preferences regarding how the mobile device should adapt to certain environments. An abstracted contextual situation of the user is synthesized based on this dynamic and static information. One or more adaptation directives for the mobile device of the user are determined based on the user's abstracted contextual situation. The adaptation directives are implemented for the mobile device, without user interaction, or by instructing the user to appropriately configure the mobile device.

19 Claims, 3 Drawing Sheets

U.S. PATENT DOCUMENTS

| | | | |
|---|---|---|---|
| 2004/0203899 | A1 | 10/2004 | Curtis et al. |
| 2005/0033852 | A1* | 2/2005 | Tenhunen ............... 709/229 |
| 2005/0059400 | A1* | 3/2005 | Jagadeesan et al. ......... 455/436 |
| 2005/0107093 | A1 | 5/2005 | Dowling |
| 2005/0130674 | A1 | 6/2005 | Company |
| 2005/0170849 | A1 | 8/2005 | McClelland |
| 2006/0229065 | A1* | 10/2006 | Lazaridis et al. ......... 455/414.3 |
| 2008/0004000 | A1* | 1/2008 | Boss et al. ............... 455/423 |

OTHER PUBLICATIONS

V. Vasudevan, "Ensembleware . . . " (abstract only), Proceedings of 2004 Int'l Symposium on Applications and the Internet (Saint '04).

M. Samulowitz et a., "Adaptive interaction for enabling pervasive services," Proceedings of 2nd ACM Int'l Workshop on Data Eng'g for Wireless & Mobile Access, May 2001.

* cited by examiner

MOBILE WIRELESS DEVICE ADAPTATION BASED ON ABSTRACTED CONTEXTUAL SITUATION OF USER USING NEAR-FIELD COMMUNICATIONS AND INFORMATION COLLECTORS

FIELD OF THE INVENTION

The present invention relates to adapting a mobile wireless device, such as a mobile wireless phone, based on a user's current abstracted contextual situation, and more particularly to such adaptation using technologies that employ near-field communication.

BACKGROUND OF THE INVENTION

Mobile wireless devices, such as mobile wireless phones, have become an important part of modern-day living, because of their ability to provide access to people and information, anytime and anywhere. Among the different types of mobile wireless devices that are currently available, mobile wireless phones in particular have permeated the daily lives of people, regardless of their age and occupation, in developed and developing countries alike. As of 2005, there are nearly two billion mobile wireless phone users, and this number is only like to increase in the future.

The flexibility and accessibility provided by mobile wireless phones has changed the way people expect to be connected to one another. No longer does a person have to worry about missing calls, or be confined to a single location in order to carry on a conversation. On the other hand, callers expect that calling the mobile wireless phone of another person will help in connecting to that person immediately, and tend to prefer if not expect this option.

The flexibility and accessibility provided by mobile wireless devices, such as mobile wireless phones, has been a boon to society to a large extent. However, in the case of person-to-person communications, this accessibility has resulted in an increase in the number of interrupts within people's lives. For instance, it has been found that most people find the use of mobile wireless phones in public places to be annoying. Mobile phone conversations in public have been found to be more distracting than face-to-face conversations, because people pay more attention to mobile wireless phone conversations.

These interruptions have become such an integral part of people's lives that people tend to either overlook them or react by turning off the phone or placing it in vibration mode, but only after the interruption has occurred and the damage has been done. In some situations, the abrupt ringing of a mobile wireless phone is not simply a distraction, however, but could also lead to potentially disastrous consequences. This is especially the case when a mobile wireless phone rings during a time-critical and safety-critical situation, such as when a surgeon is performing an operation within an operation theater in a hospital.

The social disturbance caused by mobile wireless phones has been addressed in several ways. One approach has been to introduce legislation regarding the use of mobile wireless phones, or cellular phones, in public places. Another approach has been to constantly educate people regarding such phone usage, by placing signs that serve as polite reminders. However, these approaches ignore the personal preferences of the mobile wireless phone users themselves, and require the users to change the preference settings on their phones manually.

A more aggressive approach is to use jamming, so that mobile wireless phones will not be able to receive incoming calls within certain environments. However, the problem with this approach is that phone jamming can affect wider areas and frequencies, in addition to those for which they are intended. Phone jamming can thus be disruptive to critical services, such as the communication operations of emergency and rescue workers. Therefore, a "one size fits all" approach may not be useful within all environments. Furthermore, adaptation of the mobile wireless device should consider the environment setting as well as user preferences. For these and other reasons, therefore, there is a need for the present invention.

SUMMARY OF THE INVENTION

The present invention relates to adapting a mobile wireless device, such as a mobile wireless phone, based on a user's current abstracted contextual situation, where the context of a user is determined using near-field communication and information collectors. In a method of one embodiment of the invention, dynamic information of a user of a mobile wireless device, such as the identity of his or her current environment, is determined using near-field communication, such as radio-frequency identification (RFID) tags. Other information regarding the user is also determined, where such other information can include the user's preferences regarding how his or her mobile wireless device should adapt to certain environments.

An abstracted contextual situation of the user is synthesized based on this dynamic and static information. This abstracted contextual situation thus reflects the user's current context, including where he or she is, and what he or she is currently doing and who he or she is with. One or more adaptation directives for the mobile device of the user are determined based on the abstracted contextual situation of the user. These adaptation directives direct how the mobile device should be configured for the abstracted contextual situation that the user is currently in. The adaptation directives are implemented for the mobile device, either without user interaction, or by instructing the user to appropriately configure his or her mobile wireless device.

A computerized system of an embodiment of the invention includes a dynamic information collecting module, a static information collecting module, and a synthesizing module. The dynamic information collecting module collects dynamic information regarding a user of a mobile wireless device, using near-field communication. The static information collecting module collects static information regarding the user of the mobile device. The synthesizing module synthesizes an abstracted contextual situation of the user based on the dynamic and static information collected, to determine one or more adaptation directives for the mobile wireless device based on this abstracted contextual situation. The adaptation directives are then implemented for the mobile device.

A mobile wireless phone device of an embodiment of the invention includes a communication component, a configuration component, and an RFID tag reader and/or one or more RFID tags affixed to the device. The communication component may be used for conveying context information from the mobile wireless device to backend servers, and for communicating adaptation directives from remote servers to the device. The configuration component is for implementing one or more adaptation directives that are determined based on an abstracted situation of the user of the device that is synthesized based on the dynamic and static information of the user.

The RFID tag reader, when built into the device, detects and reads one or more RFID tags located within an environment in which the user of the mobile phone device is currently located and that stores dynamic information such as the identity of the environment and activities scheduled to take place within the environment. The RFID tags affixed to the mobile wireless phone device, where present, store information such as a user-specific identity of the user and the schedule of the user.

Embodiments of the invention provide for advantages over the prior art. The social problem arising from mobile wireless device usage can be alleviated when the caller has some awareness of the context of the callee and where users do not have to manually configure their devices to reduce distraction. Context awareness becomes part of the mobile wireless device in one embodiment of the invention, where this awareness is used to enable personalized adaptations, since each user may require a different kind of adaptation within the same context. Context can mean a combination of environmental and personal information that is used to determine the adaptation required. The adaptation considers the context of the callee, and optionally, to some degree that of the caller.

Prior art approaches have derived context by mapping imprecise data gathered by general-purpose sensors to higher-level context using complex inferencing techniques. The effectiveness of adaptation in this case depends on the precision of the sensory data and the accuracy of the inferencing. By comparison, at least some embodiments of the invention improve the accuracy and latency of the adaptation by gathering precise, high-level context at the outset, reducing the need for complex inferencing. Furthermore, existing features of commercial, off-the-shelf mobile wireless phones are leveraged, providing for more seamless context-based adaptation, without having to change the interface between a user and his or her mobile phone.

Still other advantages, aspects, and embodiments of the invention will become apparent by reading the detailed description that follows and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Prior to description of embodiments of the invention, some definitions are provided herein in a general and non-restrictive manner. Abstracted contextual information includes the combined information collected from static and dynamic information collectors, and aggregated to determine the current context of the user. User preferences are the preferences of the user with respect to how his or her mobile wireless device should adapt in a given context. Adaptation directives are the final instructions for adapting a mobile wireless device, after consideration of both user and environmental preferences for the context within which the device is located.

Figure 1:
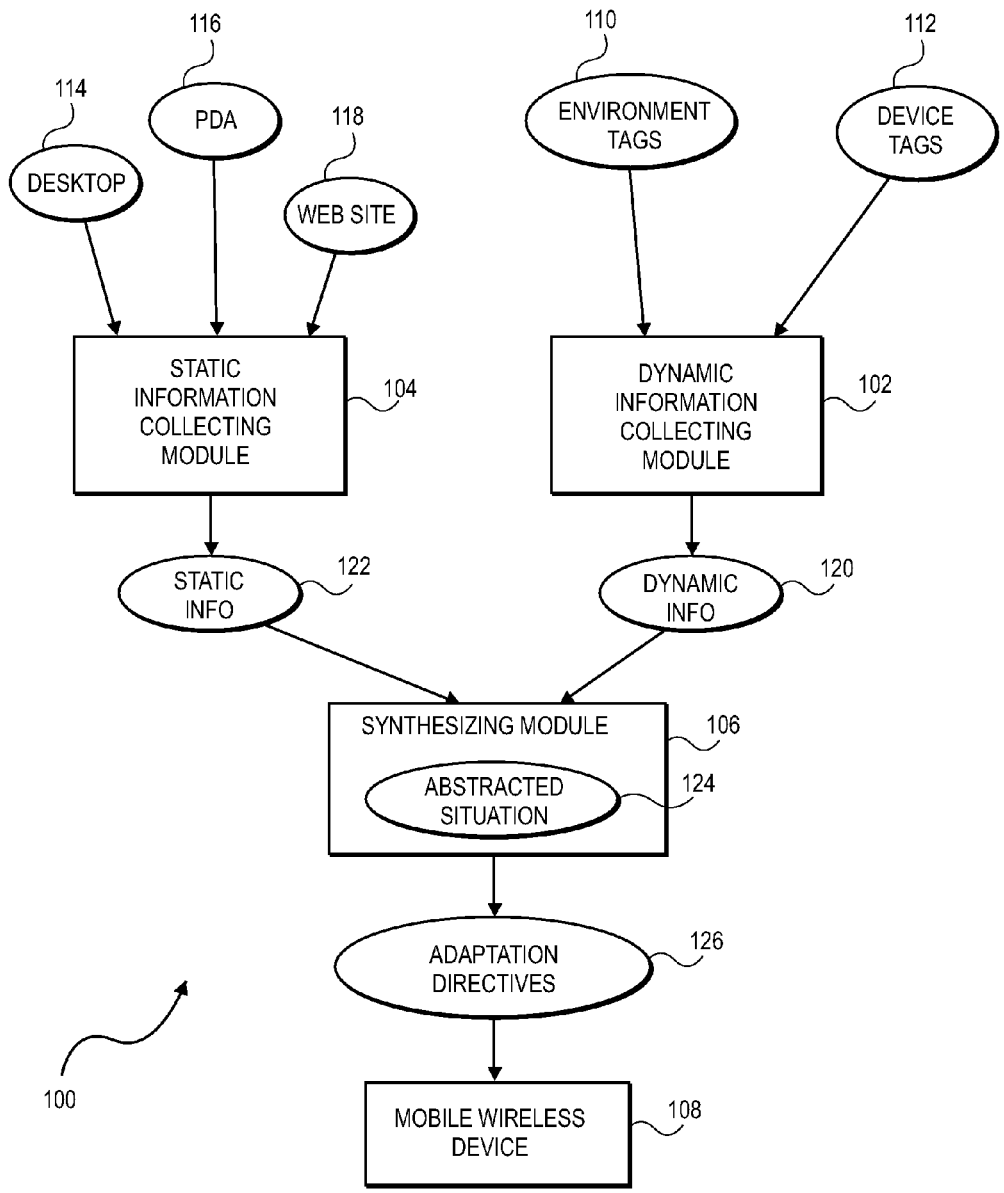
FIG. 1 is a diagram of a computerized system, according to an embodiment of the invention.

FIG. 1 shows a computerized system 100, according to an embodiment of the invention. The system 100 includes a dynamic information collecting module 102, a static information collecting module 104, and a synthesizing module 106. As can be appreciated by those of ordinary skill within the art, the system 100 may include other modules, in addition to and/or in lieu of those depicted in FIG. 1. Each of the modules 102, 104, and 106 can be implemented in software, hardware, or a combination of software and hardware.

The system 100 is directed to a mobile wireless device 108. The mobile wireless device 108 may be a mobile wireless phone, or another type of mobile wireless device that may or may not have telephony capability. It is noted that there are three types of mobile phones: regular mobile phones, near-field communication (NFC)-enabled mobile phones, and mobile phones with longer-distance communication channels. Regular mobile phones are those that do not have inherent NFC capabilities. For instance, they do not have built-in support to detect and read external RFID tags, nor are these phones intrinsically affixed with RFID tags. Such phones are also not programmable.

NFC-enabled mobile phones typically have built-in RFID readers that can be used to capture data from or store data onto external RFID tags. These phones can also be used to capture other kinds of data relevant to context, such as calendar events, from compatible NFC-enable devices, and the captured data can be stored as data entries within the phone. The built-in RFID reader can also be used to write the data entries stored in the phone to external tags. Such mobile phones are usually programmable.

Mobile phones with communication channels that are longer-distance channels than NFC channels include those that support General Packet Radio Service (GPRS) and/or Bluetooth communication capabilities, in addition to regular cellular communication technologies, such as Global System for Mobile Communications (GSM) or Code Division Multiple Access (CDMA). Longer-distance channels in this context means distances above twenty centimeters, but not wide-area communication channels. Phones use the longer-distance communication channels to communicate with backend infrastructure. They may or may not be NFC enabled.

The basic concept of operation of the system 100 is as follows. Dynamic contextual information 120 is gathered by the dynamic information collecting module 102, and static contextual information 122 is gathered by the static information collecting module 104. The contextual information 120 and 122 is conveyed to the synthesizing module 106. The synthesizing module 106 abstracts and combines this information 120 and 122 to determine an abstracted contextual situation 124 that is representative of the current context of the user of the mobile wireless device 108. From this abstracted contextual situation 124, one or more adaptation directives 126 are determined for the mobile wireless device 108, and implemented at the wireless device 108.

The various components of the system 100 are now described in detail. The context of the user of the mobile wireless device 108 is said to be "discovered" by virtue of the contextual information 120 and 122 collected by the collecting modules 102 and 104. Context is a description of the current situation at an abstract level, where the abstracted contextual situation 124 is an aggregation or synthesis of the contextual information 120 and the information 122.

Thus, in order to minimize the distractions resulting from mobile wireless phones and other devices, awareness of the context of the callee and/or the caller is needed. The caller context identifies the caller, urgency, and the time of the call. The callee context is determined by who the callee is with, the activities the callee is engaged in, and the environment the callee is in when he or she receives the call from the caller. Thus, the adaptation of the user's mobile wireless device 108 is based on synthesizing the abstracted contextual situation of the callee, based on the contextual information 120 and 122 of the caller and callee, which may further include the environmental context of the callee himself or herself.

In the case where the mobile wireless device 108 does not have any inherent NFC capability, RFID device tags 112 are explicitly affixed to the device 108. The device tags 112 store user-specific context. Examples of user-specific context include the identity (such as the phone number) of the mobile wireless device 108 of the user, the user's schedule for the day, and profiles of the user. Such profiles may indicate preferences as to how the mobile wireless device 108 is to be adapted in certain situations. For instance, such preferences may indicate that calls should be blocked when the user is in the operation theater of a hospital.

The personal context stored in the RFID device tags 112 are read by RFID readers within the environment that the user is presently located in and is used as the basis for the adaptation of the mobile wireless device 108, as is described in more detail later in the detailed description. The RFID readers may be part of the dynamic information collecting module 102, or may transmit their read information to the module 102. The information read from the device tags 112 forms part of the dynamic contextual information 120 collected by the collecting module 102.

In the case where the mobile wireless device 108 has inherent NFC capability, the personal context of the user of the device 108 may be stored within the device 108 itself. If this personal context, such as the user's calendar entries, is stored in another NFC-enabled device, then it can be transferred to the device 108 by bringing the two devices in close proximity to one another. On the other hand, the personal context stored in the phone can be transferred to external RFID tags using a built-in RFID reader/writer within the mobile wireless device 108 itself.

In addition to the RFID device tags 112, RFID environment tags 110 are employed. The RFID environment tags 110 are affixed within the environment in which the user is currently located. Where the mobile wireless device 108 is NFC enabled, its built-in RFID tag reader is able to capture the environmental context from these RFID environment tags 110. The built-in RFID tag reader may be considered a part of the dynamic information collecting module 102, or may transmit its read information to the module 102. The information read from the environment tags 110 forms part of the dynamic contextual information 120 collected by the collecting module 102.

Examples of environmental contextual information stored within the RFID environment tags 112 include the name of the environment (e.g., hospital operation theater), and the activities schedule to take place there on a given day (e.g., the list of operations and surgeons participating in the operations). Where the mobile wireless device 108 is not NFC enabled, communication of the environmental contextual information may occur by another communication approach. For instance, Bluetooth, IEEE 802.11b, or short-message service (SMS) text messages may be used.

It is noted that the RFID tags 110 and 112 are both passive tags and interchangeable. If the data storage space capacity is insufficient, then a link to the actual information may be stored. The link can then be accessed to retrieve the actual stored information using a long-distance communication channel. Such information may be stored, for instance, over a network backbone.

The dynamic information collecting module 102 thus collects information from various sources such as the RFID tags 110 and 112. The collected information 120 represents information about the user and the environment that changes dynamically. For example, an RFID environment tag can report changes in the schedule of meetings in a meeting room, location changes of an individual, and so on. There is no restriction as to where the collecting module 102 resides within the computerized system 100, so long as it is able to communicate its collected information 120 to the synthesizing module 106.

The static information collecting module 104, by comparison, collects similar information, as the static contextual information 122, but which is stored in more static repositories of the user. For instance, these sources of static information can include a desktop computer 114, a personal digital assistant (PDA) device 116, and one or more information-storing web sites 118. These information sources are static sources in that the information they provide does not vary with the location of the mobile wireless device 108. By comparison, the information provided by the tags 110 and 112 can vary depending on where the mobile wireless device 108 is currently located, due to movement of the user with his or her mobile device 108.

The static contextual information 122 collected by the collecting module 104 can also include user profiles, such as user preferences for handling phone calls in different scenarios, priority grouping of callers, alternate numbers for forwarding certain phone calls, and so on. The difference in this respect between the static information 122 and the dynamic information 120 is the source of the information in question. That is, the difference is whether the information has been received from one of the static sources by the static information collecting module 104, or from one of the dynamic sources by the dynamic information collecting module 102.

The static information 122 can also originate from other sources, besides those depicted in FIG. 1, such as a central servers of an organization of which the user of the mobile wireless device 108 is a part. The static information collecting module 104 may reside in one embodiment at a central telecommunication provider server. The module 104 also can collect static usage policies for particular environments. For instance, a meeting room policy may specify that mobile wireless phones should be kept on silent mode in meeting rooms.

The contextual information 120 and 122 collected by the collecting modules 102 and 104 is conveyed to the synthesizing module 106, which synthesizes an abstracted contextual situation 124 of the user of the mobile wireless device 108 based on this information 120 and 122. Synthesis of the abstracted contextual situation 124 is an intermediate step in determining the type of adaptation directives 126 that should be implemented on the mobile wireless device 108. The dynamic information 120 is aggregated with the static information 122, to draw such higher-level inferences represented by the abstracted contextual situation 124.

In addition to callee context, this synthesis may also take into account the available caller context. The synthesizing module 106 prioritizes and filters information 120 and 122 from the different sources, as collected by the collecting modules 102 and 104. For example, within an office environment, meetings may be held in an impromptu manner. Hence, the calendar entries may be obsolete or incorrect. However, if an RFID reader detects the presence of an employee in a conference room using the RFID device tag attached to the employee's device 108, then this dynamic locational information takes precedence over the employee's static calendar entries. Similarly, within a hospital environment, the usage policies gathered from the RFID environment tags 110 take precedence over the individual user preferences stored in the RFID device tags 112.

Because the contextual information 120 and 122 gathered by the collecting modules 102 and 104 are themselves already precise and high level, the aggregation and inference logic within the synthesizing module 106 is not complex. Thus, the synthesizing module 106 may be considered a relative thin entity, and may be optional in some circumstances to generate the abstracted situation context 124. For instance, the information 120 and 122 already provide enough information regarding the abstracted situation 124.

In one embodiment, the synthesizing module 106 may be located at a remote backend server (i.e., a server computing device), or part of the mobile service provider's system (i.e., as part of a web site of a telecommunications service provider). This may be desirable where the mobile wireless device 108 is itself not programmable. In this situation, the RFID readers within the environment gather the callee context from the RFID device tags 112 affixed to the device 108, and send this information along with the environmental context to the synthesizing module 106. The RFID readers can communication this information to the backend via RS-232, Bluetooth, or another communication channel or approach. Alternatively, if the device 108 itself supports non-cellular communication interfaces, then the RFID readers can forward the context they have gathered to the back-end or mobile service provider's server, using the long-distance messaging channels available on the device 108. The device 108 can then forward the information to the backend server or the mobile service provider's server.

In another embodiment, the synthesizing module 106 may be located at the mobile wireless device 108 itself. This may be desirable where the mobile wireless device 108 is itself programmable and is NFC enabled. In this case, the callee and caller context gathered from the device 108, along with the environmental context gathered by the built-in RFID reader of the device 108, is directly accessible to the synthesizing module 106. As such, long-distance communication channels are not needed.

The particular manner by which the abstracted situation 124 is determined from the dynamic contextual information 120 and the static contextual information 122 is not limited by embodiments of the invention. Any known and existing inferencing technique may be employed, for instance. However, as has been noted above, because the information 120 and 122 collected by the collecting modules 102 and 104 are already quite precise and high-level, the complexity associated with determining the abstracted contextual situation 124 is quite low. This is in comparison with prior art techniques, which gather much lower-level information, and thus would need fairly complex logic to determine the abstracted contextual situation 124 of the user of the mobile wireless device 108.

Therefore, once the abstracted contextual situation 124 has been determined, the adaptation directives 126 for the user of the mobile wireless device 108 corresponding to this situation 124 are determined by the synthesizing module 106, and implemented at the device 108 either automatically or with human interaction. Examples of common adaptations include: controlling ring volume; switching to an appropriate messaging mode, such as voice calling, text messaging, and so on; adapting the voice message on the device 108 to indicate the availability of the user; and, turning on or off the device. In one embodiment, a rule engine may be employed to trigger the adaptation directives 126 based on the contextual situation 124 of the user.

When using such a rule engine, to determine the appropriate adaptation, the rules may need to consider whether the callee is entering a given contextual situation, located within the situation, or leaving the situation. This information can be gathered by NFC technology, via the modules 102 and 104, and sent as inputs to the module 106. Some example environments and adaptation rules for those environments are now presented.

The first example environment is a safety-critical environment, such as a hospital. For example, the use of mobile wireless phones in intensive-care units and coronary units, where patients are monitored and pacemakers are present, can have serious consequences. Therefore, when patients and medical staff enter these areas, they should turn off their mobile wireless phones. Similarly, if the mobile wireless phone of a surgeon rings when a surgery is in progress, it may distract the surgeon and the rest of the surgery team within the operation theater.

Within such hospital environments, then, passive RFID tags may be deployed at the entrances of operations theaters, and which can store information about whether an operation is in progress and how long the procedure is likely to last. Medical staff can be provided with NFC-enabled mobile phones, so as they enter the operation theater, the mobile phones can be turned off or switched to an appropriate messaging mode. The voicemails on the mobile phones can be automatically adapted to inform the callers about the callee's current context and availability, so that callers can retry their calls at a later, more appropriate time.

Two example rules for such hospital operations are as follows. First, where the location context is such that when a person Y who is part of the surgery staff has entered or is in an operation theater X, then the adaptation directive is to turn off the phone having the number Z belonging to the person Y. Two additional adaptation directives may be to provide a voice message on this phone that the person Y is unavailable until the end time of the surgical event in question. A second rule is that when the operation theater X has been exited by this person Y, the adaptation directive is to turn on the phone having the number Z of the person Y, and turning off the voice messaging.

The second example environment is a silent environment. The ringing of a mobile wireless phone often violates the etiquette in certain public places where people should maintain silence, such as religious institutions, libraries, interview rooms, and funerals. Classrooms, meeting rooms, and concert halls belong to another class of silent environments, in which the activity takes place for a certain fixed period of time and the abrupt ringing of a phone causes distraction.

RFID readers may be placed at the entrances of these places. If people enter them with their mobile phones, the readers can record the phone numbers from the affixed tags and automatically switch the phone to a less distracting messaging mode, or turn down the volume to vibration mode. When the mobile phone user leaves the environment, the previous settings can be restored. Thus, the user is relieved from manually reconfiguring the mobile wireless phone repeatedly. Where events occur for a fixed period of time, such adaptation may be instituted only during events.

Two example rules for such silent environments are as follows. First, where the user Y is in a silent environment X, the mode of the mobile wireless phone having the number Z of the user Y is switched to text messaging mode. Second, where the user Y is in a meeting room X, and the user Y's boss is present, then the volume setting of the mobile wireless phone having the number Z of the user Y is switched to vibration only.

Therefore, more generally, the adaptation directives 126 for the mobile wireless device 108 are implemented at, by, or for the mobile wireless device 108. In the case where the mobile wireless device 108 is programmable, the adaptation directives 126 may be directed implemented at the device 108 by the device 108, without user interaction. In the case where the device 108 is not programmable, the user may be provided with a text instruction to program the phone per the directives 126.

Figure 2:
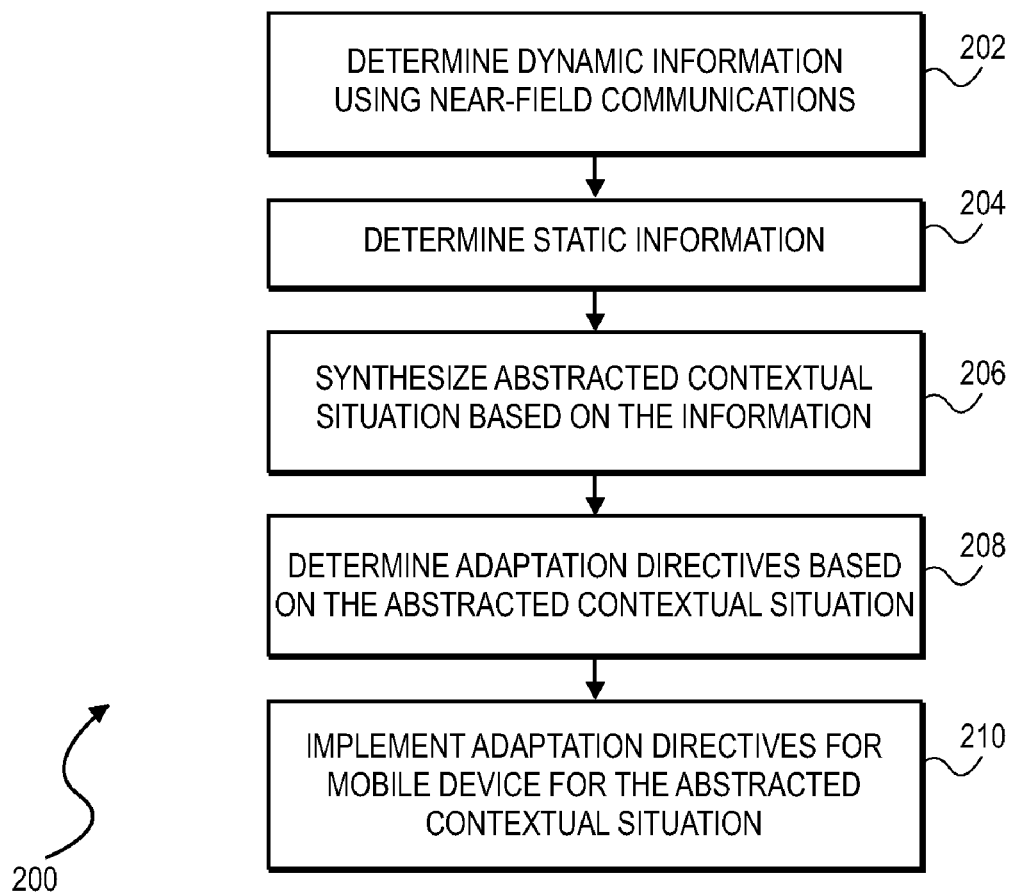
FIG. 2 is a flowchart of a method, according to an embodiment of the invention.

FIG. 2 shows a method 200 that summarizes the process described in relation to the computerized system 100 of FIG. 1, according to an embodiment of the invention. Dynamic information regarding a user of a mobile wireless device is determined using NFC (202). For instance, RFID tags within an environment in which the user of the mobile wireless device is currently located may be detected and read. This dynamic information may include the identity of the environment in which the user is currently located, as well as activities scheduled to occur in this environment. As another example, an RFID tag reader within the environment may detect and read RFID tags affixed to the mobile wireless device itself. This dynamic information may include a user-specific identity of the user of the device, as well as the user's schedule.

Static information regarding the user is also determined (204). This static information may include user preferences regarding the adaptation directives for his or her mobile device. The static information may be retrieved from a computing device other than the mobile device itself, and/or from the mobile device itself. It is noted that whereas part 202 is depicted as being performed prior to part 204, in actuality part 204 can be performed before part 202, or substantially at the same time as part 202.

An abstracted contextual situation of the user of the device is synthesized based on the information collected (206). Adaptation directives are then determined based on this abstracted contextual situation (208), and are implemented for the mobile wireless device of the user (210). For instance, the mobile device may be configured in accordance with the adaptation directives without user involvement. Alternatively, the user may be instructed to configure the device in accordance with the directives.

Figure 3:
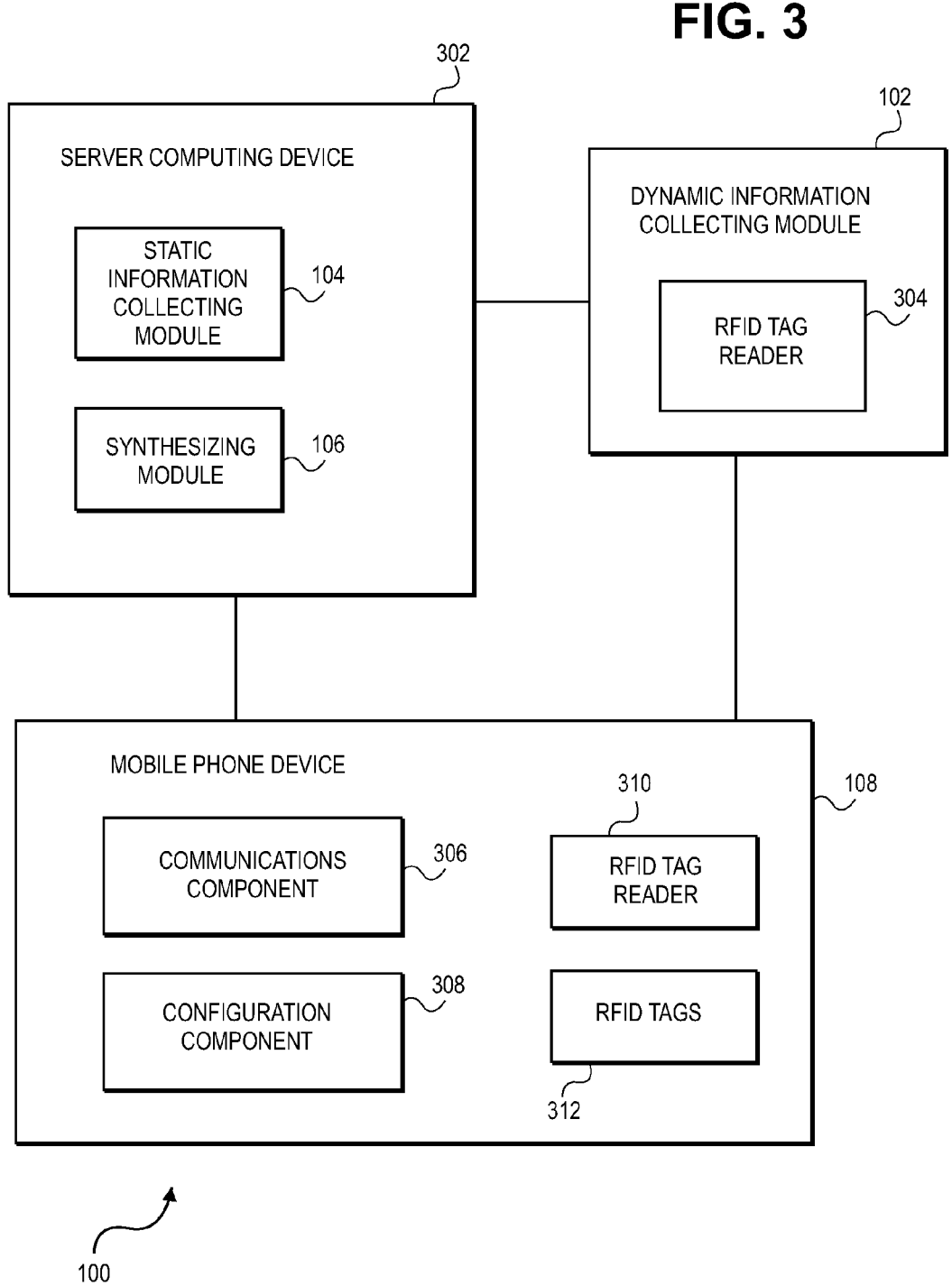
FIG. 3 is a diagram showing one manner by which the computerized system of FIG. 1 can be implemented, according to an embodiment of the invention.

FIG. 3 shows an example implementation of the computerized system 100 of FIG. 1, according to an embodiment of the invention. The system 100 includes a server computing device 302 at which the static information collecting module 104 and the synthesizing module 106 are implemented. The mobile device 108 is particularly a mobile phone device. It is noted that the implementation of the system 100 as depicted in FIG. 3 can be varied in other embodiments of the invention.

The dynamic information collecting module 102 includes an RFID tag reader 304, which is to detect and read the RFID tags 312 of the mobile phone device 108, which store a user-specific identity of the user and/or a schedule of the user. The mobile phone device 108 also may include an RFID tag reader 310, and in such an embodiment, the reader 310 may be functionally considered part of the module 102. The RFID tag reader 310 is to detect and read RFID tags located within the environment in which the user of the device 108 is currently located. These RFID tags may store the identity of the environment and the activities scheduled to take place in this environment.

The static information collecting module 104, disposed at the server computing device 302, may retrieve static information from a computing device other than the mobile phone device 108 itself, such as user preferences regarding the adaptation directives for the mobile device 108. Alternatively, the module 104 may retrieve such static information from the mobile phone device 108 itself. The adaptation directives determined by the synthesizing module 106 may be implemented at the phone device 108 with or without user interaction.

The mobile phone device 108 also includes a communication component 306, which enables the device 108 to convey context information from the device 108 to remote backend servers, and for communicating adaptation directives from remote servers to the mobile device 108, as well as a configuration component 308 in one embodiment. Where present, the component 308 allows the synthesizing module 106 to implement the adaptation directives on the device 108, without interaction from the user. Where the component 308 is not present, the user thus has to manually implement the adaptation directives himself or herself.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
   determining dynamic information regarding a user of a mobile wireless device using near-field communication;
   determining static information regarding the user of the mobile wireless device;
   synthesizing an abstracted contextual situation of the user of the mobile wireless device based on the dynamic information and the static information;
   determining one or more adaptation directives for the mobile wireless device based on the abstracted contextual situation of the user; and,
   implementing the adaptation directives for the mobile wireless device for the abstracted contextual situation of the user of the mobile wireless device.

2. The method of claim 1, wherein the mobile wireless device is a mobile wireless phone of the user.

3. The method of claim 1, wherein determining the dynamic information regarding the user of the mobile wireless device using near-field communication comprises detecting and reading one or more radio-frequency identification (RFID) tags within an environment in which the user of the mobile wireless device is currently located.

4. The method of claim 3, wherein detecting and reading the RFID tags within the environment in which the user of the mobile wireless device is currently located comprises reading at least one of: an identity of the environment in which the user is currently located and activities scheduled to take place within the environment in which the user is currently located, from the RFID tags within the environment.

5. The method of claim 1, wherein determining the dynamic information regarding the user of the mobile wireless device using near-field communication comprises detecting and reading one or more radio-frequency identification (RFID) tags affixed to the mobile wireless device of the user, via an RFID tag reader within an environment in which the user of the mobile wireless device is currently located.

6. The method of claim 5, wherein detecting and reading the RFID tags affixed to the mobile wireless device of the user comprises reading at least one of: a user-specific identity of the user of the mobile wireless device and a schedule of the user of the mobile wireless device, from the RFID tags affixed to the mobile wireless device.

7. The method of claim 1, wherein determining the static information regarding the user of the mobile wireless device comprises retrieving the static information from a computing device other than the mobile wireless device.

8. The method of claim 1, wherein determining the static information regarding the user of the mobile wireless device comprises determining user preferences regarding the adaptation directives for the mobile wireless device of the user.

9. The method of claim 1, wherein determining the static information regarding the user of the mobile wireless device comprises retrieving the static information from the mobile wireless device of the user.

10. The method of claim 1, wherein implementing the adaptation directives for the mobile wireless device for the abstracted contextual situation of the user comprises configuring the mobile wireless device in accordance with the adaptation directives without user involvement.

11. The method of claim 1, wherein implementing the adaptation directives for the mobile wireless device for the abstracted contextual situation of the user comprises instructing the user to configure the mobile wireless device in accordance with the adaptation directives.

12. A computerized system comprising:
a dynamic information collecting module to collect dynamic information regarding a user of a mobile wireless device, using near-field communication;
a static information collecting module to collect static information regarding the user of the mobile wireless device;
a synthesizing module to synthesize an abstracted contextual situation of the user of the mobile wireless device based on the dynamic information and the static information collected and to determine one or more adaptation directives for the mobile wireless device based on the abstraction situation of the user,
wherein the adaptation directives for the mobile wireless device for the abstracted contextual situation of the user of the mobile wireless device are implemented for the mobile wireless device.

13. The computerized system of claim 12, wherein the mobile wireless device is a mobile wireless phone of the user.

14. The computerized system of claim 12, wherein the dynamic information collecting module comprises a radio-frequency identification (RFID) tag reader to detect and read one or more RFID tags affixed to the mobile wireless device of the user and storing at least one of: a user-specific identity of the user of the mobile wireless device and a schedule of the user of the mobile wireless device.

15. The computerized system of claim 12, wherein the dynamic information collecting module comprises a radio-frequency identification (RFID) tag reader disposed at the mobile wireless device to detect and read one or more RFID tags located within an environment in which the user of the mobile wireless device is currently located and storing at least one of: an identity of the environment in which the user is currently located and activities scheduled to take place within the environment in which the user is currently located.

16. The computerized system of claim 12, wherein the static information collecting module is disposed at a server computing device and is to retrieve the static information from a computing device other than the mobile wireless device, the static information comprising user preferences regarding the adaptation directives for the mobile wireless device of the user.

17. The computerized system of claim 12, wherein the static information collecting module is disposed at a server computing device and is to retrieve the static information from the mobile wireless device, the static information comprising user preferences regarding the adaptation directives for the mobile wireless device of the user.

18. The computerized system of claim 12, wherein the synthesizing module is to implement the adaptation directives for the mobile wireless device by configuring the mobile wireless device in accordance with the adaptation directives without user involvement, and is disposed at one or more of: a server computing device, a web site of a telecommunications service provider, the mobile wireless device itself, and an RFID tag reader.

19. The computerized system of claim 12, wherein the synthesizing module is disposed at a server computing device and is to implement the adaptation directives for the mobile wireless device by instructing the user to configure the mobile wireless device in accordance with the adaptation directives.

* * * * *